United States Patent [19]

Yanagiuchi

[11] 3,737,993

[45] June 12, 1973

[54] METHOD OF MAKING A MULTI-CHANNEL MAGNETIC HEAD

[75] Inventor: Yukihiro Yanagiuchi, Osaka, Japan

[73] Assignee: Matsushita Electric Industrial Co. Ltd., Kadoma, Osaka, Japan

[22] Filed: Nov. 18, 1971

[21] Appl. No.: 200,078

[30] Foreign Application Priority Data

| | | |
|---|---|---|
| Nov. 27, 1970 | Japan | 45/105259 |
| Nov. 30, 1970 | Japan | 45/106528 |
| Dec. 2, 1970 | Japan | 45/107460 |
| Dec. 2, 1970 | Japan | 45/107460 |
| Dec. 2, 1970 | Japan | 45/10746 |

[52] U.S. Cl. .......... 29/603, 179/100.2 C

[51] Int. Cl. .......... G11b 5/42, H01f 7/06

[58] Field of Search .......... 29/603; 179/100.2 C; 340/174.1 F; 346/74 MC

[56] References Cited

UNITED STATES PATENTS

| | | | |
|---|---|---|---|
| 3,660,892 | 5/1972 | Tanaka et al. | 29/603 |
| 3,400,386 | 9/1968 | Sinnott | 29/603 X |
| 3,475,815 | 11/1969 | Girdner | 29/603 |
| 3,545,077 | 12/1970 | Suzuki et al. | 29/603 |

*Primary Examiner*—Charles W. Lanham
*Assistant Examiner*—Carl E. Hall
*Attorney*—E.F. Wenderoth, John E. Lind and V. M. Creedon

[57] ABSTRACT

A method of making a multi-channel magnetic head. Two magnetic core members having windings wound thereon are joined to each other on the flat surface of a support plate in order to make an elementary head unit. A plurality of elementary head units, separating plates and sheets are stacked so that a separating plate is sandwiched between each elementary head unit and each sheet. The body of stacked elements is cut into two halves in at least one plane which is perpendicular to the flat surfaces of the support plates and which divides each of the magnetic cores and sheets into two parts. A plurality of the cut sheets is taken out of the cut body so as to leave a plurality of slits in the cut body. A plurality of shield plates are inserted into the slits and the two halves are rejoined at the plane of the cut with gap spacers of non-magnetic material between the two halves.

7 Claims, 5 Drawing Figures

INVENTOR
YUKIHIRO YANAGIUCHI

BY Wenderoth, Lind & Ponack
ATTORNEYS

PATENTED JUN 12 1973

3,737,993

INVENTOR
YUKIHIRO YANAGIUCHI

BY Wenderoth, Lind & Ponack
ATTORNEYS

METHOD OF MAKING A MULTI-CHANNEL MAGNETIC HEAD

This invention relates to a method of making a multi-channel magnetic head, especially a head for use with a tape with narrow tracks and a high track density.

A conventional multi-channel magnetic head is prepared in the following way. C-shaped core members or C-shaped and I-shaped core members having windings thereon are alternately stacked with a suitable space between adjacent core members in order to form a half of a multi-channel magnetic head. Then the two halves are joined with a spacer positioned therebetween. Each of the core members in one half matches up with a corresponding core member in the other half to form an elementary head of a ring type.

In such a construction method, it is difficult to match up the core members in one half exactly with the corresponding core members in the other half. When the tracks on the tapes to be recorded and reproduced by the elementary heads are narrow, the mismatching of core members is very serious.

There is another conventional method of making a multi-channel magnetic head. Two core members are matched up with each other on a flat surface of a plate so as to form an elementary head unit. Then, a plurality of elementary head units are stacked to make a multi-channel magnetic head. In such a construction method, it is comparatively easy to match up two core members with each other exactly, but it is difficult to align the magnetic gaps in a straight line.

A new method of making a multi-channel gaps in a straight line is disclosed in copending U.S. application Ser. No. 67,822 filed Aug. 28, 1970. In this method, the stack of a plurality of elementary head units is cut into two halves in at least one plane which is perpendicular to the flat surface of the support plates and which divides each of the magnetic cores into two parts. The two halves are rejoined with a spacer between them with the core parts in one half matched with corresponding core parts in the other half. In such a construction method, shield plates between adjacent magnetic cores are also cut into two parts. Therefore, there is a great amount of cross-talk between adjacent channels.

An object of the present invention is to provide a method of making a multi-channel magnetic head in which the core members in one part of the head are matched up exactly with corresponding core members in the other part of the head, in which all the magnetic gaps are aligned in one straight line, in which there is very little cross-talk between adjacent channels and which can handle a tape with a high track density.

This object is achieved by a method of making a multi-channel magnetic head according to the present invention which comprises the following steps;

1. providing a support plate having a flat surface;
2. providing two magnetic core members having windings wound thereon;
3. joining said magnetic core members to each other on said flat surface of said support plate to make an elementary head unit;
4. providing a plurality of separating plates and sheets;
5. stacking a plurality of said elementary head units, said separating plates and sheets into a body in which one of said separating plates is sandwiched between each elementary head unit and each sheet;
6. cutting the body of stacked elements into two halves in at least one plane which is perpendicular to said flat surfaces of said support plates and which divides each of said magnetic cores and said sheets into two parts;
7. taking a plurality of said cut sheets out of the halves of the cut body so as to leave a plurality of slits in said halves of the cut body; and
8. inserting a plurality of shield plates into said slits and rejoining said two halves at the plane of the cut with gap spacers of non-magnetic material between said two halves.

These and other features of the invention will be apparent from the following detailed description taken together with the accompanying drawings, in which.

Figure 1:
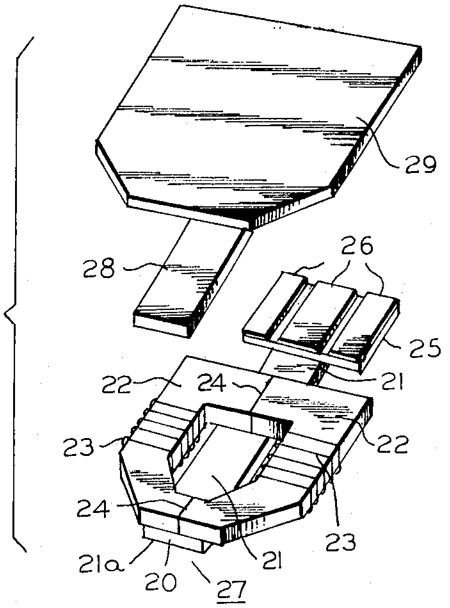
FIG. 1 is an exploded perspective view showing components of the multi-channel magnetic head.

Referring to FIG. 1, reference character 20 designates a support plate which has two opposite flat surfaces 21 and 21*a*. The support plate 20 is made of non-magnetic material such as brass, bronze or BeCu. Reference character 22 designates C-shaped core members. Windings 23 are wound on said core members 22.

Two core members 22 are placed on the flat surface 21 of said support plate 20 and joined to each other at 24 to form a ring core.

A terminal plate 25 with terminals 26 is attached to the support plate 20. The windings 23 are electrically connected to the terminals 26. An elementary head unit 27 is thereby formed.

Figure 3:
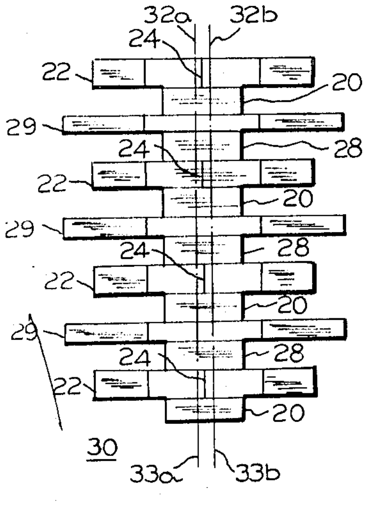
FIGS. 2 and 3 are a side cross-sectional view and a front view of the stacked body.
Figure 2:
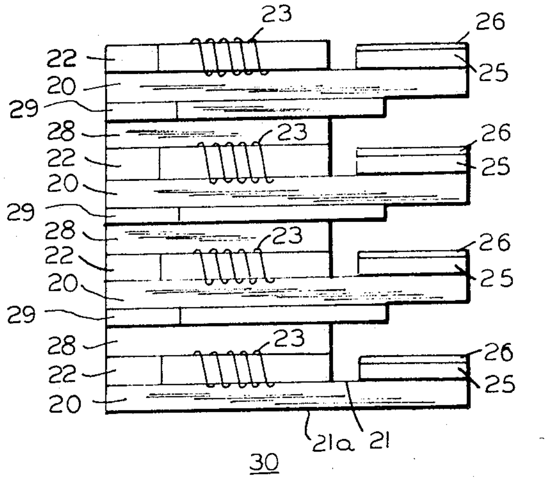

Said elementary head unit 27 has a separating plate 28 of non-magnetic material placed thereon. On said separating plate 28, a sheet 29 is placed. Said sheet 29 is large enough to cover said two core members 22. A plurality of said elementary head units 27, said separating plates 28 and said sheets 29 are stacked in a way that one of said separating plates 28 is sandwiched between each of said elementary head units 27 and each of said sheets 29 such as shown in FIG. 2 and FIG. 3 and the stacked units 27, plates 28 and sheets 29 form a body 30. If necessary, the body 30 is molded or casted in a resin in order that all the components of the stacked body can be mounted more firmly. The joints 24 of the core members 22 are aligned in one substantially straight line and lie between two planes 32*a* and 32*b*.

Then the body 30 is cut into two halves 33*a* and 33*b* along the planes 32*a* and 32*b* which are perpendicular to the support plates 20 and parallel to each other so that each of the ring cores formed by two C-shaped core members 22 are divided again into two C-shaped core parts. Said sheets 29 are also divided into two parts. All the joints 24 of the C-shaped core members 22 between said two planes 32*a* and 32*b* are thus removed. In practice, the stacked body 30 is cut by a blade as wide as the distance between the planes 32*a* and 32*b*. The two planes are preferably spaced 0.1–1.0mm from each other.

Figure 4:
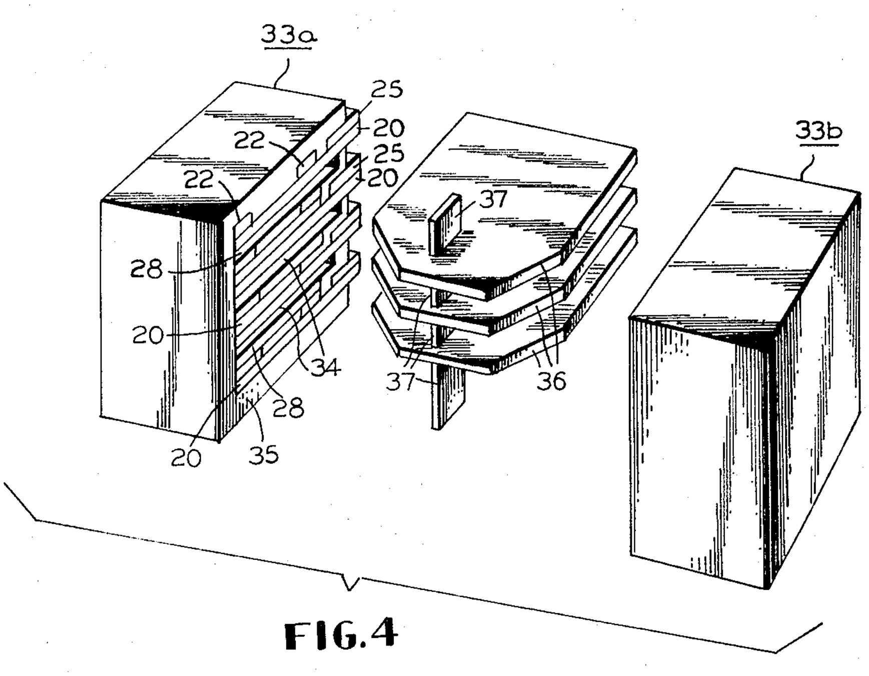
FIG. 4 is an exploded perspective view showing a further step in the method of making a multi-channel magnetic head according to the present invention.

Then, said cut sheets 29 are taken out of the cut body so as to leave a plurality of slits 34 in said cut body as shown in FIG. 4, for example, by one of the following methods. The first method is to pull out the cut sheets mechanically. But it is very difficult to apply the force to the cut sheets. A centrifugal force is very useful for removal of the cut sheets. The halves 33*a* and 33*b* are, for example, mounted on a periphery of the rotatable disc with the cut surface 35 to the outside of the disc. The cut sheets 29 are pulled out by a centrifugal force when the disc is rotated. It is better to use the sheets of a material which is slidable between said separating plates and said support plates, such as teflon, or to use sheets coated with lubricant.

The second method is to use, as a sheet, a material which will melt at relatively low temperature, such as solder or wax, and remove it by heating. Centrifugal force is also useful for this method, because the slits are so narrow that the liquid material flows out by itself only with difficulty. Solders with a low melting temperature are useful for the false shield plates, because the sheets are relatively rigid at room temperature and melt at a low temperature of 80° C–180° C, so that components of the stacked body other than said sheets are safe from the heat damage. The third method is to dissolve the cut sheets 29 by a solvent. For example, sheets made of polystyrol can be dissolved by thinner and taken out by the aid of centrifugal force or ultrasonic vibration. Another method to make the slits is that in which the sheets are made of material such as foamed styrol and the cut body is heated in order that the cut sheets 29 will be shrunk into an extremely small volume.

Figure 5:
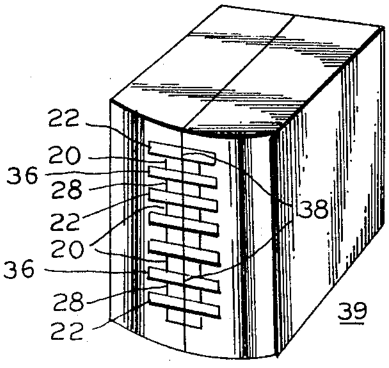
FIG. 5 is a perspective view of a finished magnetic head made according to the method of the present invention.

The cut surfaces 35 are polished flat and smooth. Then a shield plate 36 slightly smaller than the initial sheet 29 is inserted into each of said slits 34. Said two halves 33*a* and 33*b* are placed in face-to-face relationship with non-magnetic gap spacers 37 between them. The core parts 22 in one half 33*a* match up again with corresponding core parts 22 in the other half 33*b* to form the elementary heads in a ring type core as shown in FIG. 5. The gap spacer 37 forms a magnetic gap 38 between each pair of corresponding core parts. The width of the gap 38 is substantially equal to the thickness of the gap spacers 37.

The composite body 39 shown in FIG. 5 is enclosed in a shield case to protect the multi-channel magnetic head from undesired external fields.

Since each two core members 22 are joined to each other on one flat surface 21 of a support plate 20, said C-shaped core parts 22 match up exactly with each other even when said core members 22 are thin. When the two halves of the body are rejoined, the core parts in one half match up exactly with the corresponding core parts in the other half when the shield plates 36 are inserted into the slits 34. Moreover, it is obvious that the magnetic gaps 38 are exactly aligned in one straight line.

Since the shield plates are not cut into halves, the multi-channel magnetic head made by the method according to the present invention permits very little cross-talk between adjacent channels. Since the multi-channel magnetic head made by the method according to the present invention can have a small track width and a small space between the channels, it is able to handle a tape with a high track density.

I claim:

1. A method of making a multi-channel magnetic head, comprising:

1. providing a support plate having a flat surface;
2. providing two magnetic core members having windings wound thereon;
3. joining said two magnetic core members to each other on said flat surface of said support plate to make an elementary head unit;
4. providing a plurality of separating plates and sheets;
5. stacking a plurality of said elementary head units, said separating plates and sheets into a body in which one of said separating plates is sandwiched between each elementary head unit and each sheet;
6. cutting the body of stacked elements into two halves in at least one plane which is perpendicular to said flat surfaces of said support plates and which divides each of said magnetic cores and said sheets into two parts;
7. taking a plurality of the cut sheets out of the halves of the cut body so as to leave a plurality of slits in said halves of the cut body; and
8. inserting a plurality of shield plates into said slits and rejoining said two halves at the plane of the cut while positioning gap spacers of non-magnetic material between said two halves.

2. A method of making a multi-channel magnetic head as claimed in claim 1 wherein said sheets are pulled out of said halves of said cut body by centrifugal force.

3. A method of making a multi-channel magnetic head as claimed in claim 1 wherein said sheets are of a material which is slidable between said separating plates and said support plates.

4. A method of making a multi-channel magnetic head as claimed in claim 1 wherein said sheets are coated with lubricant before being stacked.

5. A method of making a multi-channel magnetic head as claimed in claim 1 wherein said cut sheets are of a material which melts at a temperature at which the remainder of the parts of the magnetic head are not damages, and the step of taking said sheets out of said body halves comprises heating the cut sheets to melt them and removing the melted material from the slits.

6. A method of making a multi-channel magnetic head as claimed in claim 1 wherein said cut sheets are of a soluble material, and the step of taking the cut sheets out of said body halves comprises dissolving the cut sheets in a solvent therefor.

7. A method of making a multi-channel magnetic head as claimed in claim 1 wherein said cut sheets are of a material which can be shrunk into an extremely small volume by heating at a temperature at which the remainder of the parts of the magnetic head are not damaged, and the step of taking said cut sheets out of said body halves comprises heating the cut sheets to shrink them to an extremely small volume and removing the residue from the slits.

* * * * *